United States Patent
Kojima et al.

(10) Patent No.: US 11,221,044 B2
(45) Date of Patent: Jan. 11, 2022

(54) ROLLING BEARING

(71) Applicant: JTEKT CORPORATION, Osaka (JP)

(72) Inventors: Keisuke Kojima, Kashiba (JP); Katsuyuki Harada, Yamatokoriyama (JP); Naoki Masuda, Kitakatsuragi-gun (JP); Hironori Hiraoka, Yao (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/039,242

(22) Filed: Sep. 30, 2020

(65) Prior Publication Data
US 2021/0095721 A1 Apr. 1, 2021

(30) Foreign Application Priority Data

Oct. 1, 2019 (JP) .............................. JP2019-181153
Oct. 1, 2019 (JP) .............................. JP2019-181212

(51) Int. Cl.
*F16C 33/41* (2006.01)
*F16C 33/38* (2006.01)
*F16C 19/16* (2006.01)
*F16C 19/06* (2006.01)

(52) U.S. Cl.
CPC .......... *F16C 33/3806* (2013.01); *F16C 19/16* (2013.01); *F16C 33/416* (2013.01); *F16C 33/418* (2013.01); *F16C 19/06* (2013.01)

(58) Field of Classification Search
CPC .......... F16C 33/41–418; F16C 33/3837; F16C 33/3856; F16C 33/3887; F16C 33/3806; F16C 33/6681; F16C 33/4605; F16C 19/06; F16C 19/16; F16C 43/065
See application file for complete search history.

(56) References Cited

U.S. PATENT DOCUMENTS

| 2,360,419 | A | * | 10/1944 | Hickling | ............... | F16C 33/425 |
| | | | | | | 384/534 |
| 3,195,965 | A | * | 7/1965 | Van Dorn | ........... | F16C 33/3806 |
| | | | | | | 384/475 |
| RE36,804 | E | * | 8/2000 | Kajihara | ............. | F16C 33/6603 |
| | | | | | | 277/402 |

(Continued)

FOREIGN PATENT DOCUMENTS

| JP | 2015-057558 A | | 3/2015 |
| JP | 2017194141 A | * | 10/2017 |

OTHER PUBLICATIONS

Machine Translation of JP-2017194141-A (Year: 2017).*

*Primary Examiner* — Alan B Waits
(74) *Attorney, Agent, or Firm* — Oliff PLC

(57) ABSTRACT

A rolling bearing includes: an inner ring; an outer ring; a plurality of rolling elements provided between an inner ring raceway and an outer ring raceway; and a cage that holds the rolling elements at intervals in a circumferential direction. The cage includes an annular portion provided in a first axial direction with respect to the rolling elements, and a plurality of cage bars provided to extend in a second axial direction from the annular portion. The annular portion includes a contact surface that makes sliding contact with a shoulder portion. The cage bars each include a first projecting portion and a second projecting portion. The second projecting portion covers a part of the inner ring raceway on a side of the shoulder portion.

7 Claims, 11 Drawing Sheets

(56) References Cited

U.S. PATENT DOCUMENTS

| | | | |
|---|---|---|---|
| 8,529,135 B2* | 9/2013 | Duffy | F16C 33/6681 384/470 |
| 2011/0142388 A1* | 6/2011 | Maejima | F16C 33/6674 384/523 |
| 2011/0299805 A1* | 12/2011 | Damato | F16C 19/163 384/531 |
| 2017/0138398 A1* | 5/2017 | Niedermeier | F16C 33/418 |

* cited by examiner

ROLLING BEARING

CROSS-REFERENCE TO RELATED APPLICATION

This application claims priority to Japanese Patent Application No. 2019-181153 filed on Oct. 1, 2019 and Japanese Patent Application No. 2019-181212 filed on Oct. 1, 2019, each incorporated herein by reference in its entirety.

BACKGROUND

1. Technical Field

The present disclosure relates to a rolling bearing.

2. Description of Related Art

Rolling bearings are used in various devices. Among others, ball bearings in which rolling elements are balls are used for high-speed rotation. A ball bearing includes an inner ring, an outer ring, a plurality of balls, and an annular cage that holds the balls. In the case of a ball bearing (in particular, a deep-groove ball bearing), a cage of a so-called crown type and made of a resin is used from the viewpoint of assemblability. The crown-type cage has an annular portion and a plurality of cage bars provided to extend in the axial direction from the annular portion. Spaces formed between each pair of cage bars that is adjacent in the circumferential direction serve as pockets for receiving the balls.

The crown-type cage holds the balls at equal intervals in the circumferential direction, and is positioned by contacting the balls in the pockets. That is, rotation of the crown-type cage is guided by the balls. This manner of guiding is called "rolling-element guiding". Japanese Unexamined Patent Application Publication No. 2015-57558 (JP 2015-57558 A) discloses a cage of a crown type.

SUMMARY

In the crown-type cage, the cage bars are held in a cantilever manner. Therefore, the cage bars are elastically deformed toward the outer ring by a centrifugal force when the rolling bearing is rotated. When the rotational speed becomes higher and the cage bars are deformed more significantly, a part of the cage may strongly contact the balls or the outer ring. In this case, wear of the cage may be promoted to break the cage.

In order to suppress deformation of the cage bars due to a centrifugal force and contact of a part of the cage with the balls, it is conceivable to make the pockets large compared to the balls. In this case, however, gaps between the balls and the pockets become large, and an abnormal sound may be generated by contact between the cage and the balls when the cage is rotated in an oscillating manner.

There are also proposed outer ring-guided rolling bearings in which rotation of the cage is guided by the outer ring, rather than rolling element-guided rolling bearings. In this case, the cage is provided in proximity to the inner peripheral surface of the outer ring. When the rolling bearing is used in a high-speed rotation environment, the amount of deformation of the cage bars occasionally becomes larger than an assumed value because of a centrifugal force. In this case, a part of the cage may make uneven contact with the outer ring to cause uneven wear of the part of the cage.

In this manner, the cage is guided by making sliding contact with constituent members (balls or outer ring) of the rolling bearing. When the rolling bearing is used in a high-speed rotation environment, in particular, the cage is deformed by a centrifugal force, and it is desirable to suppress wear of the cage. Thus, it is an object of the present disclosure to provide a rolling bearing in which wear of a cage can be suppressed even in the case where the rolling bearing is used in a high-speed rotation environment.

An aspect of the present disclosure provides a rolling bearing. The rolling bearing includes: an inner ring that includes a shoulder portion provided in a first axial direction and an inner ring raceway; an outer ring that includes an outer ring raceway; a plurality of rolling elements provided between the inner ring raceway and the outer ring raceway; and a cage that holds the rolling elements at intervals in a circumferential direction. The cage includes an annular portion provided in the first axial direction with respect to the rolling elements, and a plurality of cage bars provided to extend in a second axial direction from the annular portion. The annular portion includes a contact surface that makes sliding contact with the shoulder portion. The cage bars each include a first projecting portion provided to extend in the second axial direction from a portion including an outer peripheral side of the annular portion, and a second projecting portion provided to extend in the second axial direction from a portion including an inner peripheral side of the annular portion, the second projecting portion being shorter than the first projecting portion. The second projecting portion covers a part of the inner ring raceway on a side of the shoulder portion.

With the configuration described above, rotation of the cage is guided by the inner ring with the contact surface of the annular portion of the cage making sliding contact with the shoulder portion of the inner ring. The second projecting portion of the cage bar of the cage covers a part of the inner ring raceway on the side of the shoulder portion. Therefore, when a lubricant that is present in the part of the inner ring raceway is moved radially outward by a centrifugal force, for example, the lubricant can contact the radially inside surface of the second projecting portion, and flow toward the contact surface along the radially inside surface. Therefore, the lubricant is easily supplied to a location between the annular portion and the shoulder portion. Hence, the lubrication between the annular portion and the shoulder portion is improved, and it is possible to suppress wear due to the cage making sliding contact with the inner ring even in the case where the rolling bearing is used in a high-speed rotation environment. In addition, the second projecting portion is shorter in the axial direction than the first projecting portion. Consequently, the weight of the cage bar on the distal portion side is reduced, and it is possible to reduce deformation of the cage bar, that is, deformation of the cage, due to a centrifugal force.

In the rolling bearing, the contact surface may be provided with a recessed portion. With the configuration described above, the lubricant which is supplied to a location between the annular portion and the shoulder portion is accumulated in the recessed portion. Hence, the lubrication between the annular portion and the shoulder portion is further improved.

When the cage bar is elastically deformed by a centrifugal force, the annular portion is elastically deformed under the influence thereof. Then, a portion of the inner periphery of the annular portion on the side in the first axial direction may approach the shoulder portion. Thus, in the rolling bearing, the annular portion may include the contact surface which is able to contact the shoulder portion, a gap formed between the shoulder portion and the contact surface being uniform along an axial direction, and an undercut surface provided continuously in the first axial direction from the contact surface to extend away from the shoulder portion toward the first axial direction. With the configuration described above, as the cage is deformed, a portion of the inner periphery of the annular portion on the side in the first axial direction is moved closer to the shoulder portion, and the portion of the inner periphery of the annular portion on the side in the first axial direction is formed as the undercut surface. Therefore, it is possible to suppress uneven contact (edge contact) of the annular portion with the shoulder portion.

In the rolling bearing, in addition, a radially inside surface of the second projecting portion and the contact surface may be continuous with each other, and provided along an imaginary cylindrical surface centered on a bearing center line. With the configuration described above, a lubricant in the part of the inner ring raceway easily flows from the radially inside surface of the second projecting portion to the contact surface of the annular portion.

In the rolling bearing, a radially inside surface of the first projecting portion may be provided along a second imaginary cylindrical surface centered on the bearing center line, the second imaginary cylindrical surface being larger in diameter than the imaginary cylindrical surface. With the configuration described above, the weight of the cage bar on the distal portion side is reduced.

With the configuration described above, it is possible to suppress wear of the cage even in the case where the rolling bearing is used in a high-speed rotation environment.

In order to reduce a centrifugal force that deforms the cage, the weight of the cage bar may be reduced. To that end, as illustrated in FIG. 10, for example, a cage bar 90 may be chipped on the inner peripheral side so that the cage bar 90 has a stepped shape on the radially inner side. FIG. 10 is a sectional view of a crown-type cage 96.

A rolling bearing that includes the crown-type cage 96 is assembled as follows. First, a plurality of balls is disposed between an inner ring and an outer ring. Next, as illustrated in FIG. 11, the cage 96 is assembled to the balls 97. In the crown-type cage 96, pockets 93 that receive the balls 97 open with a dimension that is smaller than the diameter of the balls 97. Therefore, the cage 96 may be assembled by moving the cage 96 closer to the balls 97 in the axial direction and further pressing the cage 96. Consequently, the balls 97 are received in the pockets 93 through the opening with a part of the cage bar 90 elastically deformed.

If the cage bar 90 has a stepped shape on the radially inner side as described above, however, a projecting portion 95 on the inner peripheral side may be caught on a part (shoulder portion) 99a of an inner ring 99 on the outer peripheral side during assembly of the cage 96 to hinder the assembly. If the cage 96 is pressed forcibly, the projecting portion 95 which is made of a resin may be damaged.

Thus, in the rolling bearing, the cage may include a guide portion provided on a radially inner side of the first projecting portion and in the second axial direction from the second projecting portion to align the cage with respect to the inner ring by contacting a part of an outer peripheral portion of the inner ring during assembly of the cage.

With the configuration described above, the weight of the cage bar of the cage is reduced because of the second projecting portion which is shorter than the first projecting portion. Therefore, it is possible to reduce a centrifugal force that deforms the cage (cage bar). The pockets open on the second axial side with a dimension that is smaller than the diameter of the balls. Therefore, when assembling the cage, the balls are received in the pockets through the opening by moving the cage closer to the balls from the first axial direction and further pressing the cage. In this event, a part of the cage bar is elastically deformed such that the balls widen the opening. During the assembly, the assembly may be hindered with the second projecting portion caught on a part of the outer peripheral portion of the inner ring, and the second projecting portion may be damaged if the cage is pressed forcibly. With the rolling bearing, however, the cage is aligned (centered) with the inner ring by the guide portion of the cage. Hence, it is possible to suppress the second projecting portion being caught on the part of the outer peripheral portion of the inner ring to hinder the assembly.

In the rolling bearing, the guide portion may include a flat surface that faces the shoulder portion of the inner ring on a first axial side and that is continuous with an inner peripheral surface of the annular portion in an unassembled state in which a portion of a pocket in the second axial direction contacts a part of a hemispherical surface of the rolling element in the first axial direction. The pocket may be provided between a pair of the cage bars, which is adjacent in the circumferential direction, to receive the rolling element. The pocket may open in the second axial direction with a dimension that is smaller than a diameter of the rolling element. With the configuration described above, the assembly of the cage is completed by linearly pressing the cage in the unassembled state toward the second axial side.

In the rolling bearing, the guide portion may include an inclined surface that extends away from the inner ring toward the second axial direction from the flat surface. With the configuration described above, when the cage is moved closer to the balls, which are provided between the inner ring and the outer ring, from the first axial direction in order to assemble the cage, the inclined surface contacts a part of the outer peripheral portion of the inner ring before the unassembled state is established. The inclined surface allows the cage to be aligned with the inner ring as the cage is moved closer to the balls in the axial direction.

In the rolling bearing, the annular portion may include a contact surface that makes sliding contact with the shoulder portion of the inner ring in the first axial direction. With the configuration described above, the rolling bearing is an inner ring-guided bearing in which rotation of the cage is guided by the inner ring. In the case of an inner ring-guided bearing, the cage and the inner ring are disposed in proximity to each other. Therefore, a part (second projecting portion) of the cage contacts the inner ring during assembly of the cage, which tends to hinder the assembly. With the guide portion, however, it is possible to suppress the second projecting portion being caught on the part of the outer peripheral portion of the inner ring to hinder the assembly. That is, even the inner ring-guided cage can be assembled smoothly by the guide portion.

With the configuration described above, it is possible to reduce a centrifugal force that deforms the cage (cage bar). Further, it is possible to suppress the part (second projecting portion) of the cage bar, which is configured to reduce the centrifugal force, being caught on a part of the outer peripheral portion of the inner ring to hinder the assembly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overall Configuration of Rolling Bearing

Figure 1:
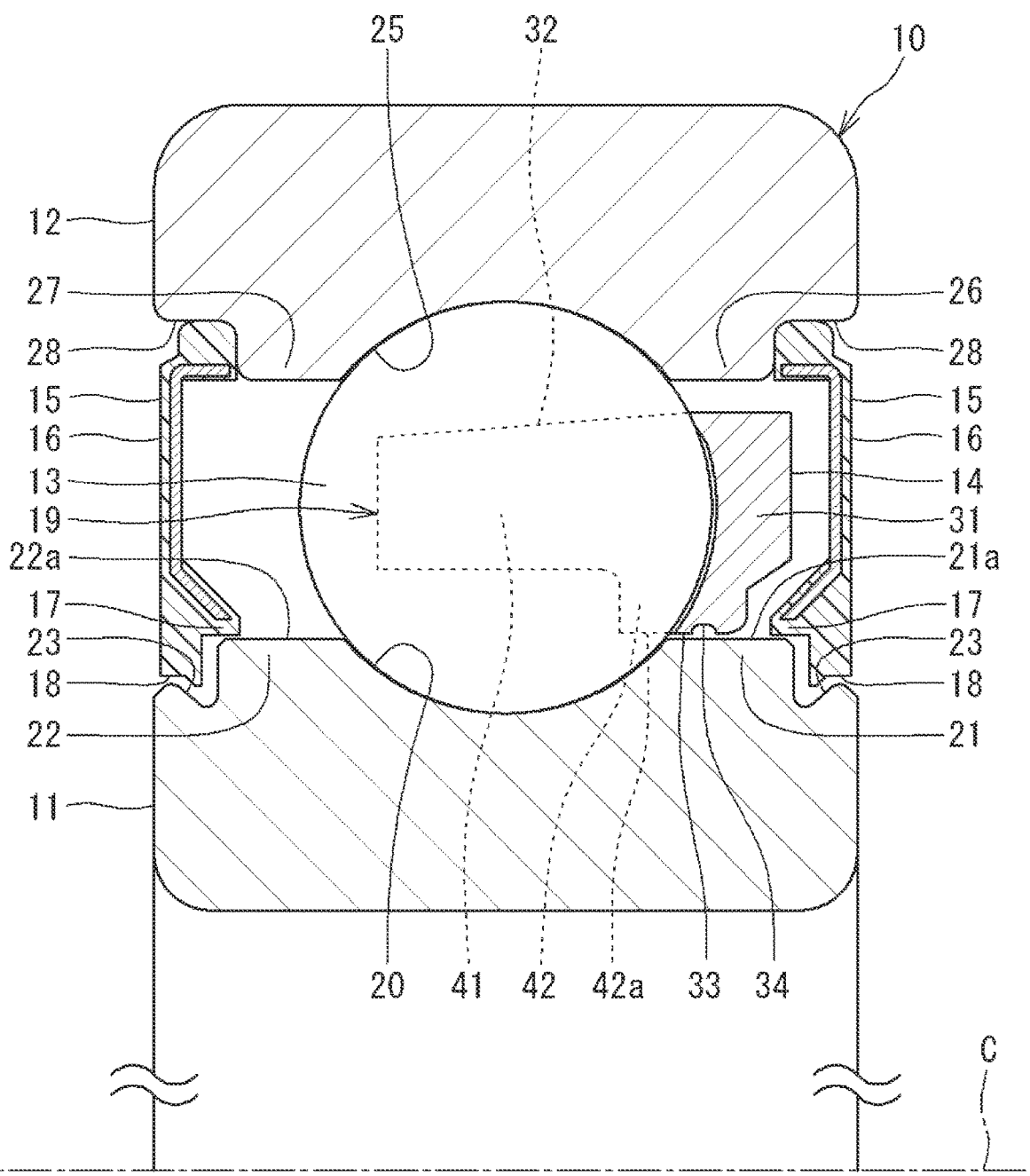
FIG. 1 is a sectional view illustrating an example of a rolling bearing.

FIG. 1 is a sectional view illustrating an example of a rolling bearing. A rolling bearing 10 illustrated in FIG. 1 includes an inner ring 11, an outer ring 12 provided on the radially outer side of the inner ring 11, a plurality of rolling elements provided between the inner ring 11 and the outer ring 12, and an annular cage 14 that holds the rolling elements at intervals in the circumferential direction. The rolling elements are balls 13. The rolling bearing 10 is a ball bearing. In particular, the rolling bearing 10 illustrated in FIG. 1 is a deep-groove ball bearing.

In the present disclosure, the direction along a center line C (hereinafter referred to as a "bearing center line C") of the rolling bearing 10 corresponds to the axial direction of the rolling bearing 10, and is simply referred to as an "axial direction". The axial direction includes a direction that is parallel to the bearing center line C. The right side in FIG. 1 is defined as a first axial side. The left side in FIG. 1 is defined as a second axial side. The direction which is orthogonal to the bearing center line C corresponds to the radial direction of the rolling bearing 10, and is simply referred to as a "radial direction". The direction in which the rolling bearing 10 (in the present disclosure, the inner ring 11) is rotated about the bearing center line C corresponds to the circumferential direction of the rolling bearing 10, and is simply referred to as a "circumferential direction".

The rolling bearing 10 further includes sealing devices 15 on both sides in the axial direction. An annular space formed between the inner ring 11 and the outer ring 12 is the space inside the bearing in which the balls 13 and the cage 14 are provided. The sealing devices 15 suppress leakage of a lubricant inside the bearing (annular space) to the outside of the bearing. The sealing devices 15 also have a function of suppressing entry of foreign matter outside the bearing into the bearing.

The lubricant which is used in the rolling bearing 10 according to the present disclosure is grease. In particular, channeling grease is used. The channeling grease is pushed out of the way when the balls 13 pass raceways (20, 25) in the inner ring 11 and the outer ring 12, and does not easily return to the raceways (20, 25). The grease stays in a vacant space inside the bearing and adheres to the surface of the cage 14 etc., and base oil contained in the grease flows out to contribute to lubrication. Churning grease with relatively high flowability may also be used as the lubricant, rather than the channeling grease, or oil may also be used.

The inner ring 11 is an annular member. An inner ring raceway 20 in which the balls 13 roll is formed in the outer periphery of the inner ring 11. The inner ring raceway 20 has a concave arcuate sectional shape, the radius of which is slightly larger than that of the balls 13, in a section including the bearing center line C. The inner ring 11 has a shoulder portion 21 (first shoulder portion 21) on the first axial side of the inner ring raceway 20, and a shoulder portion 22 (second shoulder portion 22) on the second axial side of the inner ring raceway 20.

An outer peripheral surface 21a of the first shoulder portion 21 and an outer peripheral surface 22a of the second shoulder portion 22 each have a cylindrical surface shape centered on the bearing center line C. The outer peripheral surfaces 21a, 22a are each a polished surface. An inside peripheral groove 23 is formed in the outer periphery of the inner ring 11 on both side portions in the axial direction.

The outer ring 12 is an annular member. An outer ring raceway 25 in which the balls 13 roll is formed in the inner periphery of the outer ring 12. The outer ring raceway 25 has a concave arcuate sectional shape, the radius of which is slightly larger than that of the balls 13, in a section including the bearing center line C. The outer ring 12 has a shoulder portion 26 on the first axial side of the outer ring raceway 25, and a shoulder portion 27 on the second axial side of the outer ring raceway 25. An outside peripheral groove 28 is formed in the inner periphery of the outer ring 12 on both side portions in the axial direction.

Figure 2:
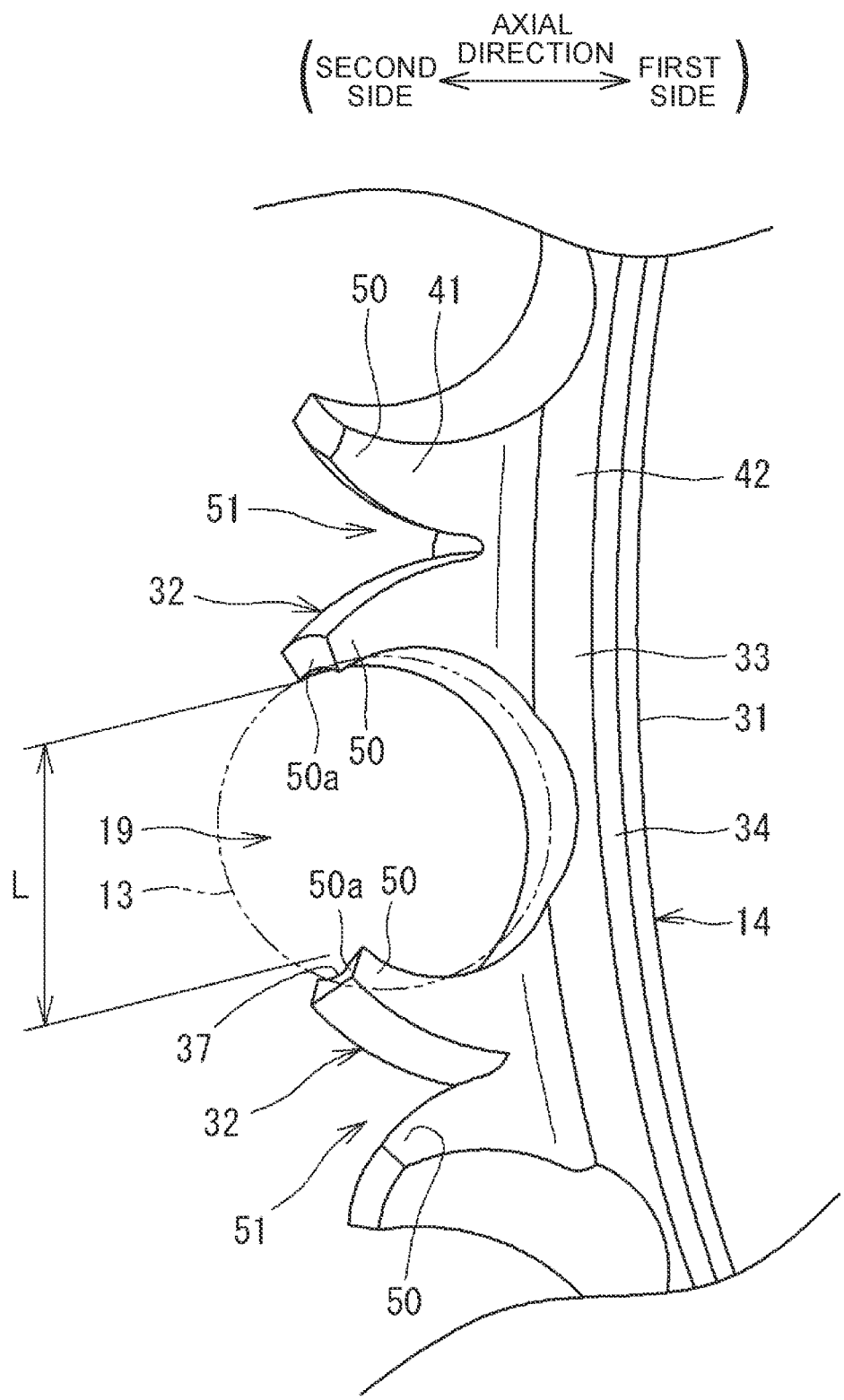
FIG. 2 illustrates a part of a cage as seen from the radially inner side.

The cage 14 is made of a resin (synthetic resin). The cage 14 has an annular portion 31 provided on the first axial side with respect to the balls 13, and a plurality of cage bars 32 provided to extend toward the second axial side from the annular portion 31. FIG. 2 illustrates a part of the cage 14 as seen from the radially inner side. In FIGS. 1 and 2, pockets 19 for receiving the balls 13 are formed on the second axial side of the annular portion 31 between each pair of cage bars 32, 32 that is adjacent in the circumferential direction. The second axial side (opening 37) of the pockets 19 open with a dimension that is smaller than the diameter of the balls 13. The cage 14 according to the present disclosure is of a so-called crown type.

In FIG. 1, the sealing devices 15 on the first axial side and the second axial side have the same configuration, but are attached in opposite directions. The sealing devices 15 each have a circular ring portion 16 in a circular ring shape, a projecting portion 18 provided at the inner peripheral end portion of the circular ring portion 16, and a lip portion 17 provided continuously with the projecting portion 18 to project toward the balls 13. The outer peripheral end portion of the circular ring portion 16 is attached to the outside peripheral groove 28.

Figure 3:
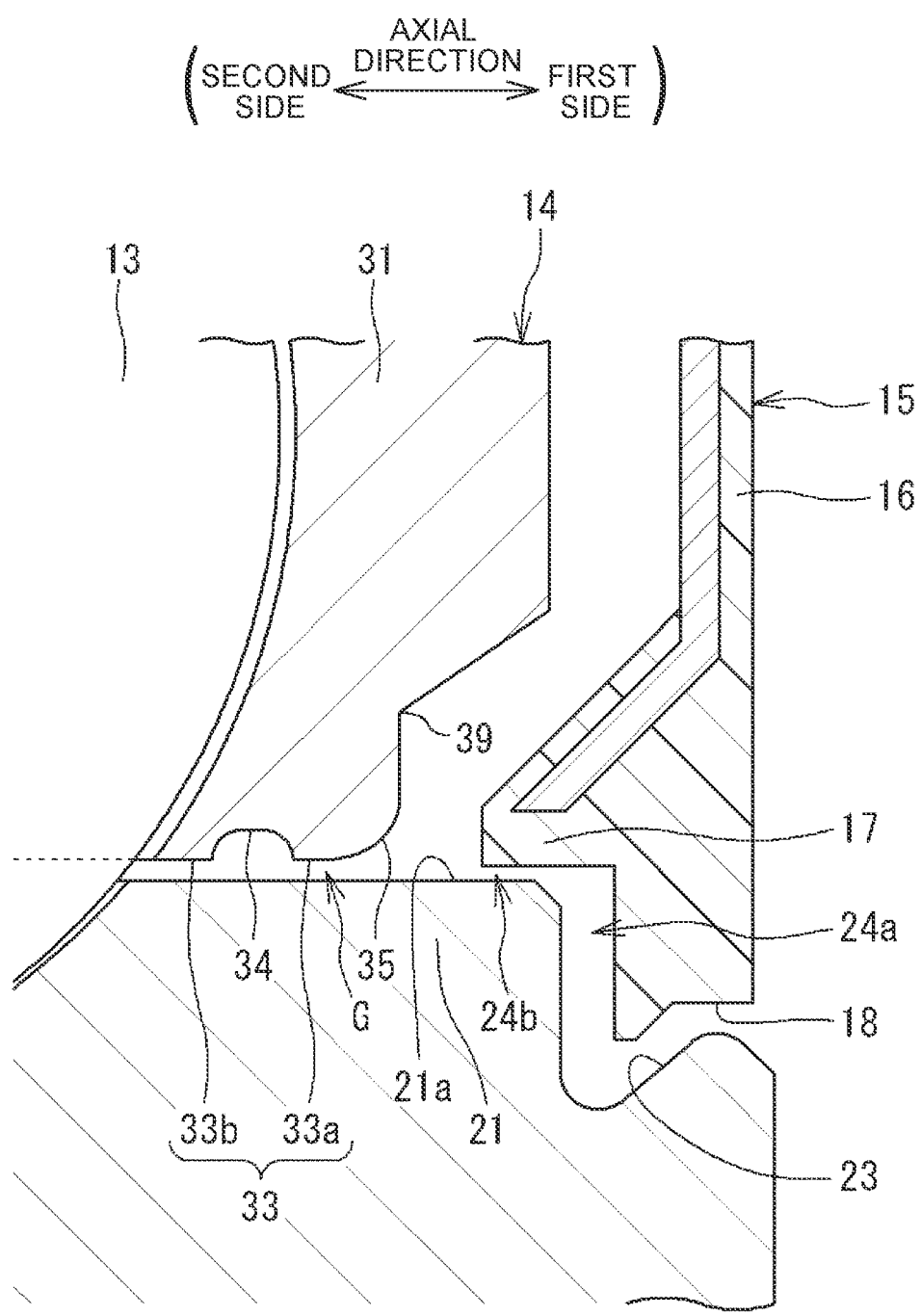
FIG. 3 is an enlarged sectional view illustrating a part, on the inner peripheral side, of a sealing device on the first axial side and a part of the cage on the inner peripheral side.

FIG. 3 is an enlarged sectional view illustrating a part, on the inner peripheral side, of the sealing device 15 on the first axial side on the inner peripheral side and a part of the cage 14. The projecting portion 18 is provided to face the inside peripheral groove 23 with a gap 24a therebetween. The lip portion 17 is provided to face the shoulder portion 21 with a radial gap 24b therebetween. The gaps 24a and 24b are minute gaps, and constitute a labyrinth gap. In order to form the gap 24b as a minute gap, in particular, the outer peripheral surface 21a of the shoulder portion 21 has been polished to form a polished surface.

Configuration of Cage 14

The configuration of the cage 14 will be further described. In FIGS. 1 and 2, the annular portion 31 is in a circular ring shape, and has a contact surface 33 provided on the inner peripheral side thereof to make sliding contact with the first shoulder portion 21. The contact surface 33 has a cylindrical surface shape centered on the bearing center line C. As illustrated in FIG. 3, the contact surface 33 is proximate to the outer peripheral surface 21a of the shoulder portion 21 in the radial direction, with a minute gap G formed therebetween. The cage 14 is slightly movable in the radial direction. Rotation of the cage 14 is guided by the inner ring 11 with the contact surface 33 making sliding contact with the outer peripheral surface 21a of the shoulder portion 21. That is, the rolling bearing 10 according to the present disclosure has an inner ring-guided cage 14.

Figure 4:
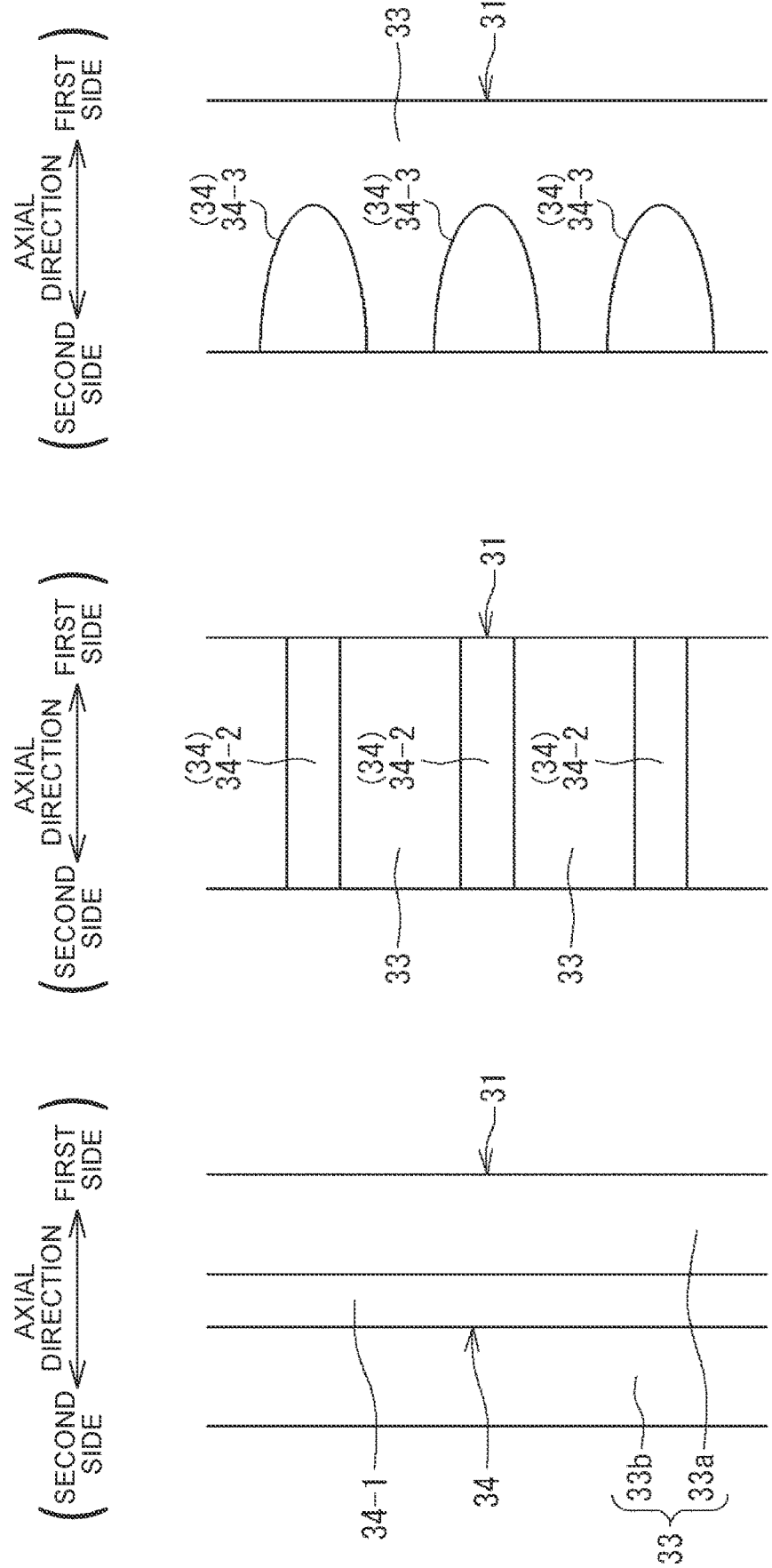
FIG. 4A illustrates a recessed groove.
FIG. 4B illustrates recessed grooves according to another embodiment.
FIG. 4C illustrates recessed grooves according to still another embodiment.

The contact surface 33 is provided with a recessed portion 34. As illustrated in FIG. 4A, the recessed portion 34 according to the present disclosure is constituted of a recessed groove 34-1 that is continuous in the circumferential direction. A surface 33a on the first axial side with respect to the recessed portion 34 and a surface 33b on the second axial side with respect to the recessed portion 34, of the contact surface 33, can contact the outer peripheral surface 21a of the shoulder portion 21 (see FIG. 3).

The recessed portion 34 may be in any other form, and may be recessed grooves 34-2 provided to extend in the axial direction as illustrated in FIG. 4B. A plurality of recessed grooves 34-2 are provided in the contact surface 33 at intervals in the circumferential direction. The recessed grooves 34-2 may be grooves that penetrate in the axial direction to open on both the first axial side and the second axial side. However, the recessed grooves 34-2 may be grooves that do not penetrate in the axial direction but that open on only the second axial side. Alternatively, as illustrated in FIG. 4C, the recessed portion 34 may be dents 34-3 that are widened in the circumferential direction and that open on only the second axial side. A plurality of dents 34-3 are provided in the contact surface 33 at intervals in the circumferential direction.

In FIG. 3, the annular portion 31 has an undercut surface 35 on the inner peripheral side thereof, besides the contact surface 33. The contact surface 33 can contact the outer peripheral surface 21a of the shoulder portion 21, with the gap G formed between the outer peripheral surface 21a of the shoulder portion 21 and the contact surface 33 being uniform along the axial direction. The undercut surface 35 is provided continuously on the first axial side of the contact surface 33, and extends away from the outer peripheral surface 21a of the shoulder portion 21 toward the first axial side. In the present disclosure, the undercut surface 35 is configured to have a round convex sectional shape (curved surface). The undercut surface 35 may be configured to have a linearly inclined sectional shape.

A cutaway portion 39 is provided on the inner peripheral side of the annular portion 31 and on the first axial side. The cutaway portion 39 suppresses interference between the cage 14 and the lip portion 17 of the sealing device 15.

Figure 5:
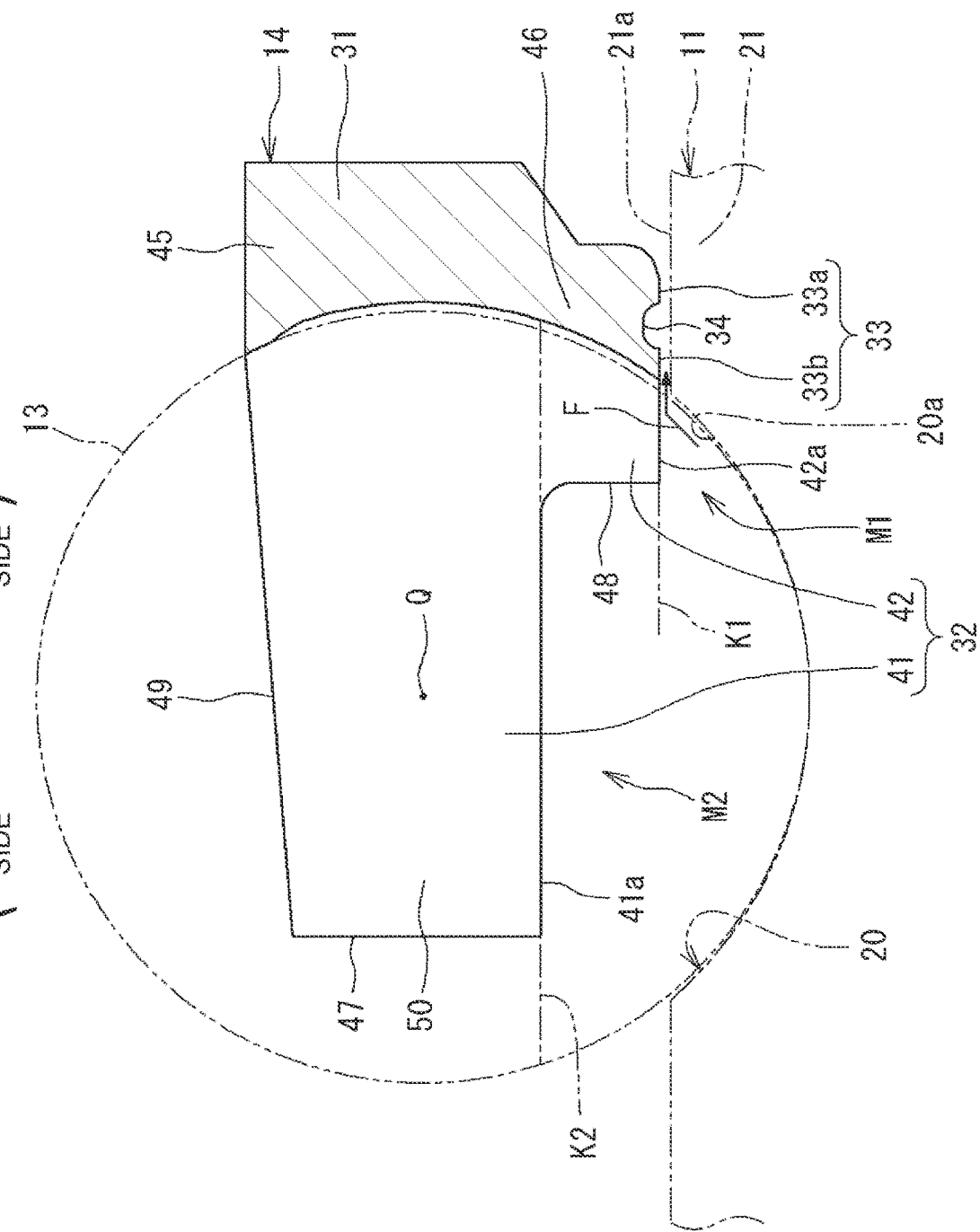
FIG. 5 is a sectional view of the cage.

FIG. 5 is a sectional view of the cage 14. The cage bar 32 will be described. The cage bar 32 has a first projecting portion 41 and a second projecting portion 42. The first projecting portion 41 is a portion of the cage bar 32 on the radially outer side. The first projecting portion 41 is provided to extend toward the second axial side from a portion 45 including the outer peripheral side of the annular portion 31. The second projecting portion 42 is a portion of the cage bar 32 on the radially inner side. The second projecting portion 42 is provided to extend toward the second axial side from a portion 46 including the inner peripheral side of the annular portion 31. The second projecting portion 42 is shorter in the axial direction than the first projecting portion 41, and covers only a part 20a of the inner ring raceway 20 on the side of the first shoulder portion 21 from the radially outer side.

An end surface 47 of the first projecting portion 41 on the second axial side is positioned on the second axial side with respect to a center Q of the ball 13 (center of the pocket 19). The first projecting portion 41 mainly holds the ball 13 and a lug portion 50 (see FIG. 2) at the distal end of the first projecting portion 41 engages the ball 13 to suppress slipping of the cage 14 from the ball 13 in the axial direction. An end surface 48 of the second projecting portion 42 on the second axial side is positioned on the first axial side with respect to the center Q of the ball 13 (center of the pocket 19). The second projecting portion 42 supports the function of holding the ball 13. The second projecting portion 42 is provided continuously with a portion (base portion) of the first projecting portion 41 on the first axial side to extend from the portion (base portion) toward the inner ring 11.

As illustrated in FIG. 5, a radially inside surface 42a of the second projecting portion 42 and the contact surface 33 of the annular portion 31 are continuous with each other. The radially inside surface 42a and the contact surface 33 are provided along a first imaginary cylindrical surface K1 centered on the bearing center line C (see FIG. 1). A radially inside surface 41a of the first projecting portion 41 is provided along a second imaginary cylindrical surface K2 that is larger in diameter than the first imaginary cylindrical surface K1 and that is centered on the bearing center line C (see FIG. 1). The radially inside surface of the cage bar 32 has a stepped shape in which the radially inside surface is close to the inner ring 11 on the side of the base portion (side of the annular portion 31), which is the first axial side, and away from the inner ring 11 on the side of the distal end, which is the second axial side.

The second projecting portion 42 of the cage bar 32 covers only the part 20a of the inner ring raceway 20 on the first axial side from the radially outer side. A space M1 between the part 20a and the second projecting portion 42 is relatively small. On the contrary, a large space M2 is formed between the remaining, large portion of the inner ring raceway 20 excluding the part 20a and the first projecting portion 41. The large space M2 suppresses a splash of the grease in the inner ring raceway 20 during rotation of the rolling bearing 10.

When the rolling bearing 10 is rotated, a centrifugal force acts on the cage 14. The cage 14 is made of a resin, and is of a crown type. In the crown-type cage 14, the cage bars 32 are held in a cantilever manner. Therefore, the cage bars 32 are elastically deformed toward the outer ring 12 by a centrifugal force when the rolling bearing 10 is rotated. The cage bars 32 are deformed more significantly as the rotational speed becomes higher. Thus, the cage 14 according to the present disclosure is configured to reduce the weight of the cage bars 32, in order to reduce generation of a centrifugal force due to the rotation and suppress deformation of the cage 14. The configuration for the weight reduction will be described below.

As described above, the cage bar 32 has the first projecting portion 41 on the radially outer side and the second projecting portion 42 on the radially inner side, and the second projecting portion 42 is shorter in the axial direction than the first projecting portion 41. This configuration contributes to the weight reduction of the cage bar 32. That is, the weight of the cage bar 32 is reduced, since the thickness of the cage bar 32 is reduced on the second axial side and the inner peripheral side of the cage bar 32.

In order to reduce the weight of the cage bar 32, a radially outside surface 49 of the cage bar 32 (first projecting portion 41) is an inclined surface inclined toward the inner ring 11 as the surface extends from the first axial side toward the second axial side. This configuration makes it difficult for the cage bar 32 to contact the outer ring 12 even if the cage bar 32 is elastically deformed toward the outer ring 12 by a centrifugal force.

As illustrated in FIG. 2, the first projecting portion 41 has a pair of lug portions 50, 50 provided to extend toward the second axial side. A lacking portion 51 in a V-shape is provided between a pair of lug portions 50, 50 of each first projecting portion 41. The lacking portion 51 is deeply cut in the axial direction, reducing the weight of the cage bar 32.

The weight of the cage bar 32 is reduced in the manner described above, reducing the generated centrifugal force. In the present disclosure, further, the axial dimension of the annular portion 31 is increased in order to make it difficult for the cage 14 to be deformed by a centrifugal force by enhancing the rigidity of the cage 14.

In FIG. 1, an opening 37 of the pocket 19 is formed between respective distal ends 50a, 50a of the two lug portions 50, 50 which face each other with the pocket 19 interposed therebetween. A maximum dimension L of the opening 37 is smaller than the diameter of the ball 13. The distal ends 50a, 50a of the lug portions 50, 50 suppress slipping of the cage 14 from the ball 13. To assemble the rolling bearing 10, the cage 14 is moved closer to the plurality of balls 13, which is interposed between the inner ring 11 and the outer ring 12, from the first axial side, and the cage 14 is further pressed toward the second axial side. In this event, the lug portions 50, 50 are pressed by the balls 13 to be elastically deformed, widening the opening 37, and the cage 14 is assembled to the balls 13.

Rolling Bearing 10 According to Present Disclosure

In the rolling bearing 10 according to the present disclosure (see FIG. 5), the annular portion 31 of the cage 14 has the contact surface 33 which makes sliding contact with the first shoulder portion 21 of the inner ring 11. With this configuration, rotation of the cage 14 is guided by the inner ring 11.

The cage bar 32 of the cage 14 has the first projecting portion 41 and the second projecting portion 42. The first projecting portion 41 is provided to extend toward the second axial side from the portion 45 including the outer peripheral side of the annular portion 31. The second projecting portion 42 is provided to extend toward the second axial side from the portion 46 including the inner peripheral side of the annular portion 31, and is shorter than the first projecting portion 41. The second projecting portion 42 covers the part 20a of the inner ring raceway 20 on the side of the first shoulder portion 21 from the radially outer side.

The second projecting portion 42 is shorter in the axial direction than the first projecting portion 41. Thus, the weight of the cage bar 32 (see FIG. 5) of the cage 14 is reduced because of the second projecting portion 42 which is shorter in the axial direction than the first projecting portion 41. Therefore, it is possible to reduce a centrifugal force that deforms the cage 14 (cage bar 32). That is, the weight of the cage bar 32 on the distal portion side is reduced, and it is possible to reduce deformation of the cage bar 32, that is, deformation of the cage 14, due to a centrifugal force.

The second projecting portion 42 covers the part 20a of the inner ring raceway 20 on the side of the first shoulder portion 21. Therefore, when grease that is present in the part 20a is moved radially outward by a centrifugal force as indicated by the arrow F in FIG. 5, the grease can contact the radially inside surface 42a of the second projecting portion 42, and flow toward the contact surface 33 along the radially inside surface 42a. Therefore, the grease is easily supplied to a location between the annular portion 31 and the first shoulder portion 21. Hence, the lubrication between the annular portion 31 and the first shoulder portion 21 is improved. As a result, it is possible to suppress wear due to the cage 14 making sliding contact with the inner ring 11 even in the case where the rolling bearing 10 is used in a high-speed rotation environment.

The radially inside surface 42a of the second projecting portion 42 and the contact surface 33 are provided continuously along the first imaginary cylindrical surface K1 which is centered on the bearing center line C. Therefore, grease in the part 20a of the inner ring raceway 20 easily flows from the radially inside surface 42a of the second projecting portion 42 to the contact surface 33 of the annular portion 31.

The contact surface 33 is provided with the recessed portion 34. Therefore, the grease which is supplied to a location between the annular portion 31 and the first shoulder portion 21 is accumulated in the recessed portion 34. Hence, the lubrication between the annular portion 31 and the first shoulder portion 21 is further improved. In the rolling bearing 10 according to the present disclosure, in particular, channeling grease is used. A large amount of grease is collected in the recessed portion 34, and the base oil of the grease is supplied to the contact surface 33.

Figure 6:
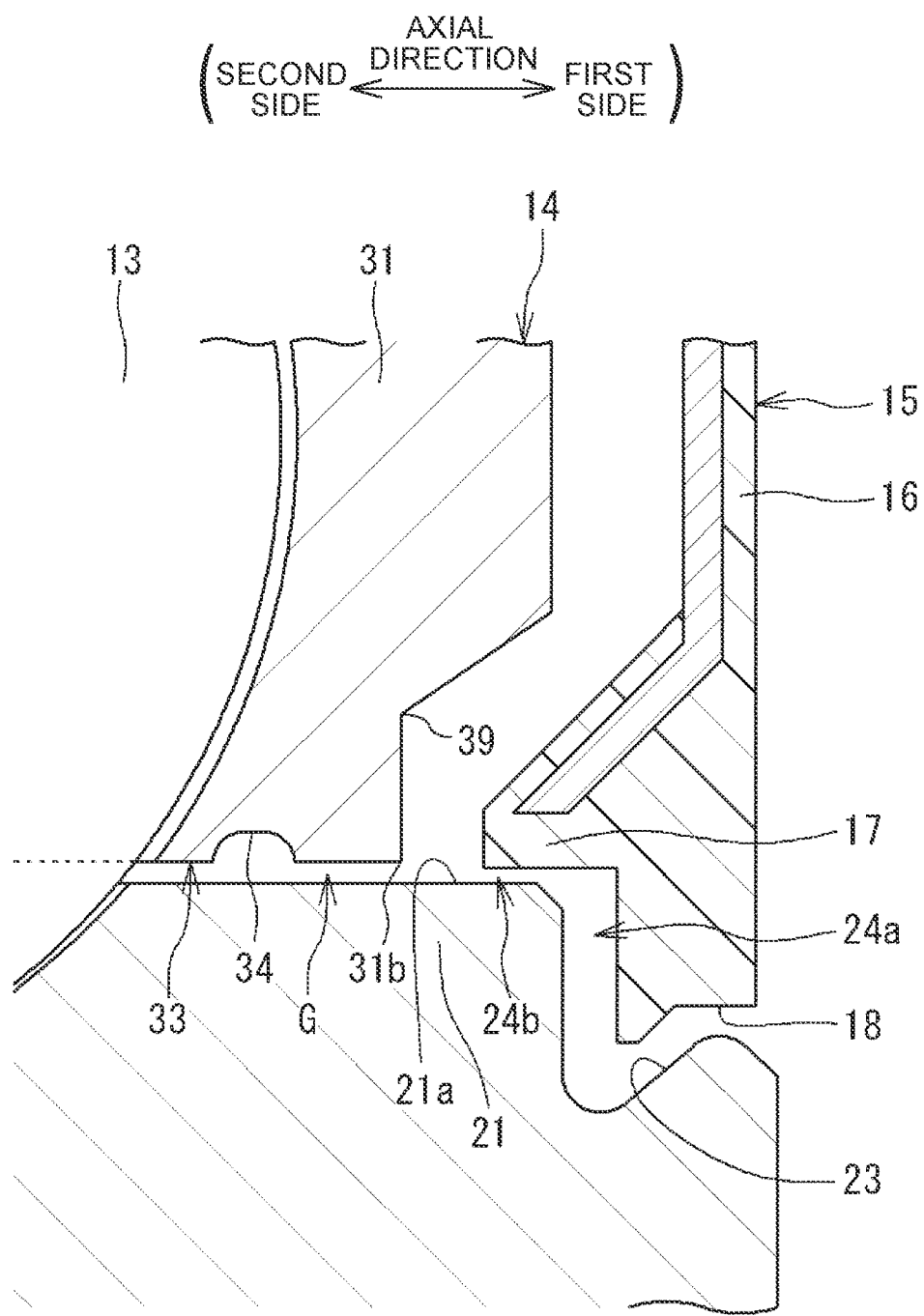
FIG. 6 is an enlarged sectional view illustrating a part of a cage (different embodiment) and surrounding components.

FIG. 6 is an enlarged sectional view illustrating a part of the cage 14 (different embodiment) and surrounding components. The annular portion 31 illustrated in FIG. 6 has the contact surface 33 as in the embodiment illustrated in FIG. 3, but does not have the undercut surface 35. When the cage bar 32 is elastically deformed by a centrifugal force, the annular portion 31 is elastically deformed under the influence thereof. In the case of the cage 14 illustrated in FIG. 6, when the cage bar 32 is elastically deformed by a centrifugal force, the first axial side (corner portion 31b) of the inner periphery of the annular portion 31 further approaches the first shoulder portion 21. When the elastic deformation is large, the corner portion 31b of the annular portion 31 may contact the first shoulder portion 21. In this case, local wear may be caused.

Thus, the annular portion 31 preferably has the undercut surface 35 on the inner peripheral side thereof as in the embodiment illustrated in FIG. 3. The undercut surface 35 is provided continuously on the first axial side from the contact surface 33, and further formed to extend away from the first shoulder portion 21 toward the first axial side. With this configuration, even if the first axial side of the inner periphery of the annular portion 31 approaches the first shoulder portion 21, the first axial side has the undercut surface 35 which is shaped as described above. Therefore, it is possible to suppress uneven contact (edge contact) of the annular portion 31 with the first shoulder portion 21.

Figure 7:
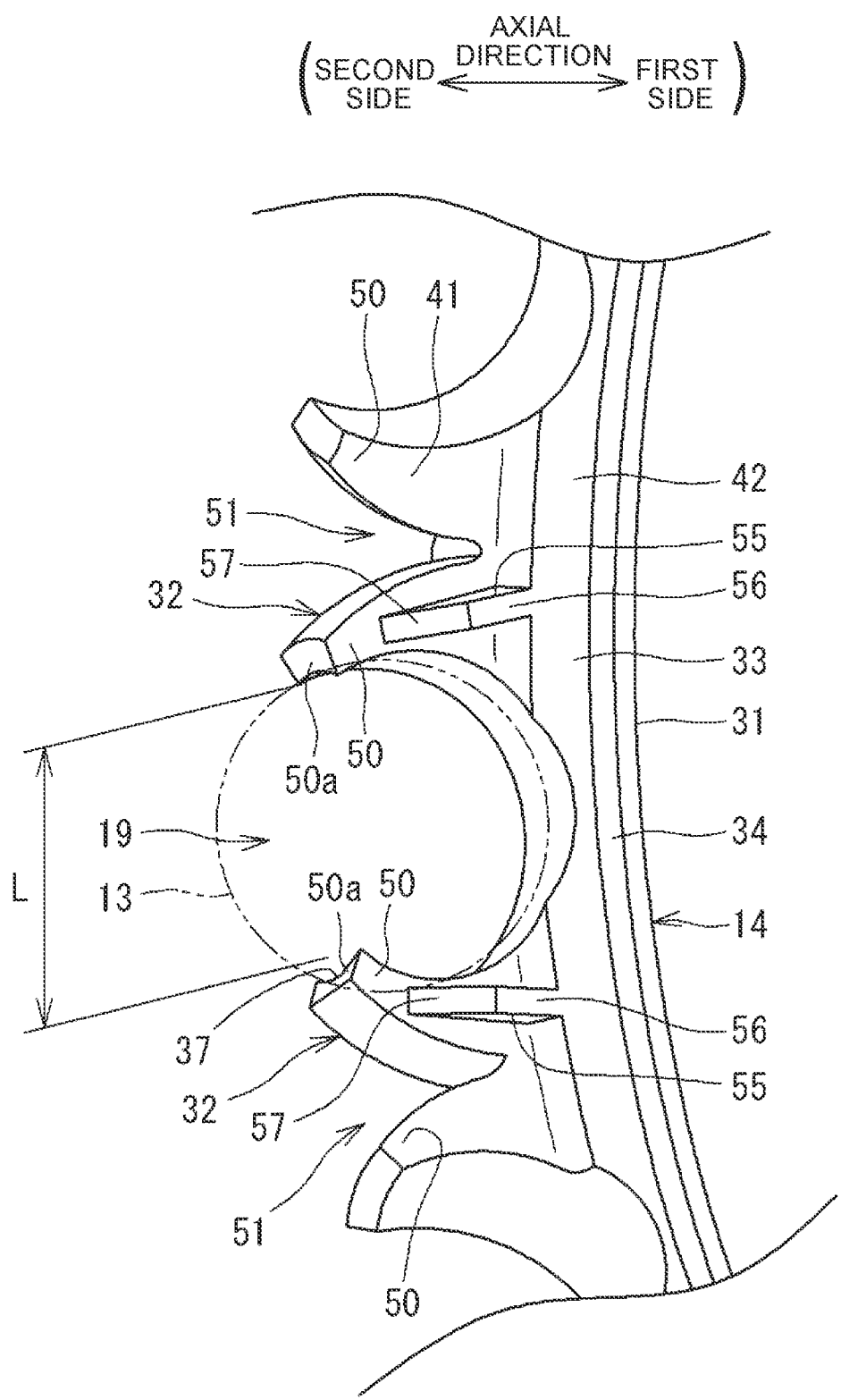
FIG. 7 illustrates a cage according to a modification, illustrating a part of the cage as seen from the radially inner side.

FIG. 7 illustrates the cage 14 according to a modification, illustrating a part of the cage 14 as seen from the radially inner side. The cage 14 has guide portions 55 on the radially inner side of the first projecting portion 41 and on the second axial side of the second projecting portion 42. When assembling the cage 14 to the balls 13 which are disposed between the inner ring 11 and the outer ring 12, the guide portions 55 contact the first shoulder portion 21, which is a part of the outer peripheral portion of the inner ring 11, to align the cage 14 with respect to the inner ring 11. While the guide portions 55 may be provided at all the cage bars 32, it is only necessary that the guide portions 55 should be provided at least three cage bars 32 at intervals (at equal intervals) in the circumferential direction.

As described above, the pockets 19 open on the second axial side with a dimension that is smaller than the diameter of the balls 13. Therefore, when assembling the cage 14, the balls 13 are received in the pockets 19 through the opening 37 by moving the cage 14 closer to the balls 13 from the first axial side and further pressing the cage 14. In this event, a part of the cage bars 32 is elastically deformed such that the balls 13 widen the opening 37.

During the assembly, the assembly may be hindered with the second projecting portion 42 caught on the first shoulder portion 21, and the second projecting portion 42 may be damaged if the cage 14 is pressed forcibly. However, the cage 14 is aligned (centered) with the inner ring 11 by the guide portions 55 of the cage 14. Hence, it is possible to suppress the second projecting portion 42 being caught on the first shoulder portion 21 to hinder the assembly.

The guide portion 55 has a flat surface 56. The flat surface 56 is continuous with the inner peripheral surface (contact surface 33) of the annular portion 31. The flat surface 56 faces the shoulder portion (first shoulder portion 21) of the inner ring on the first axial side in an unassembled state in which the second axial side (opening 37) of the pocket 19 contacts a part of the hemispherical surface of the ball 13 on the first axial side. With the flat surface 56, the assembly of the cage 14 is completed by linearly pressing the cage 14 in the unassembled state toward the second axial side.

The guide portion 55 further includes an inclined surface 57 that extends away from the inner ring 11 toward the second axial side from the flat surface 56. When the cage 14 is moved closer to the balls 13, which are provided between the inner ring 11 and the outer ring 12, from the first axial side in order to assemble the cage 14, the inclined surfaces 57 contact a part (first shoulder portion 21) of the outer peripheral portion of the inner ring 11 before the unassembled state is established. The inclined surfaces 57 allow the cage 14 to be aligned with the inner ring 11 as the cage 14 is moved closer to the balls 13 in the axial direction.

Configuration for Assembly of Cage 14

Figure 8:
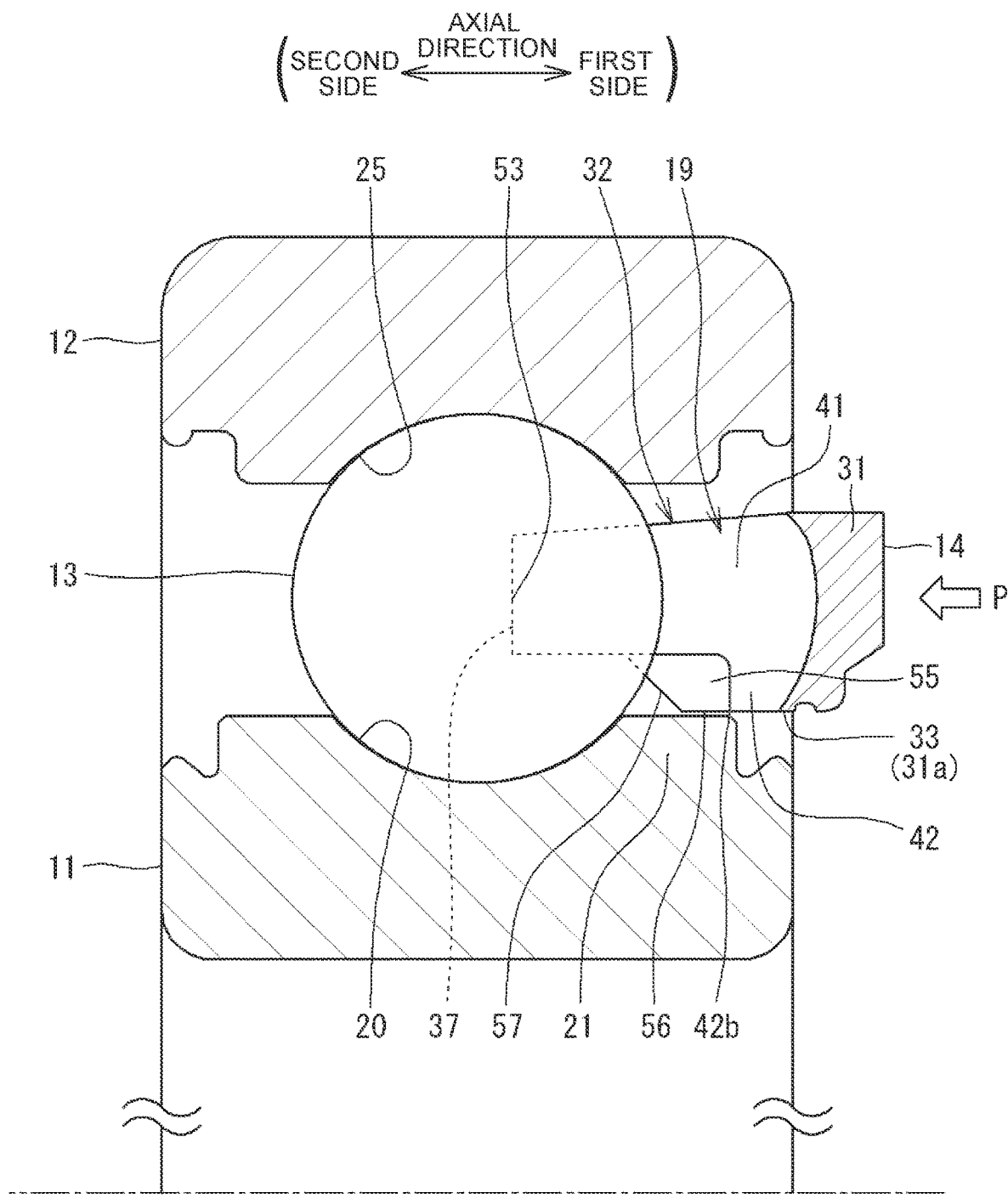
FIG. 8 illustrates a state in which a portion of a pocket on the second axial side contacts a part of a hemispherical surface of a ball on the first axial side in the cage according to the modification.

The rolling bearing 10 configured as described above is assembled as follows. First, a plurality of balls 13 is disposed between the inner ring 11 and the outer ring 12. Next, as illustrated in FIG. 8, a cage 14 is assembled to the balls 13. FIG. 8 illustrates a state in which the second axial side (opening 37) of the pocket 19 of the cage 14 contacts a part of the hemispherical surface 53 on the first axial side of the ball 13. This state is a state before the balls 13 are received in the pockets 19, and corresponds to the "unassembled state". In the case where the bearing center line C extends along the plumb line and the cage 14 is moved closer to the balls 13, which are provided between the inner ring 11 and the outer ring 12, from the upper side toward the lower side and further pressed downward to be assembled, a state in which the cage 14 is placed on the balls 13 corresponds to the unassembled state.

In the crown-type cage 14, as described above, the pockets 19 which receive the balls 13 open with a dimension that is smaller than the diameter of the balls 13 (see FIG. 7). Therefore, in order to assemble the cage 14, the cage 14 may be moved closer to the balls 13 from the first axial side and further pressed. The direction in which the cage 14 is moved closer to the balls 13 from the first axial side and further pressed is indicated by an arrow P in FIG. 8. Consequently, the cage 14 is provided at a predetermined position between the inner ring 11 and the outer ring 12 with a part of the cage bars 32 elastically deformed and with the balls 13 received in the pockets 19 through the opening 37.

In the rolling bearing 10 according to the present disclosure, as described above, the cage bar 32 includes the first projecting portion 41 and the second projecting portion 42, and the cage bar 32 has a stepped shape on the radially inner side. Therefore, it is considered that an end portion 42b of the second projecting portion 42 on the second axial side is caught on the first shoulder portion 21 of the inner ring 11 during assembly of the cage 14 to hinder the assembly.

Thus, in the present disclosure, as illustrated in FIG. 8, the cage 14 has the guide portions 55. The guide portions 55 are partially provided on the inner peripheral side of the cage 14, in order to suppress the end portion 42b of the second projecting portion 42 on the second axial side being caught on the first shoulder portion 21 of the inner ring 11.

The guide portions 55 will be described. The guide portions 55 are provided on the inner peripheral side of the cage bars 32. In the present disclosure, the guide portions 55 are provided on some of the cage bars 32. Specifically, the guide portions 55 are provided at three locations at intervals in the circumferential direction. At each of the locations, the guide portions 55 are provided on a pair of cage bars 32, 32 positioned on both sides of one pocket 19 in the circumferential direction (see FIG. 7). At each location, two guide portions 55 are provided on the pair of cage bars 32, 32 side by side in the circumferential direction with the pocket 19 interposed therebetween. The two guide portions 55 at each location constitute a set of guide members. Three sets of guide members are provided at equal intervals in the circumferential direction. The guide portions 55 may be provided over the entire periphery of the annular portion 31 or on all the cage bars 32.

Figure 9:
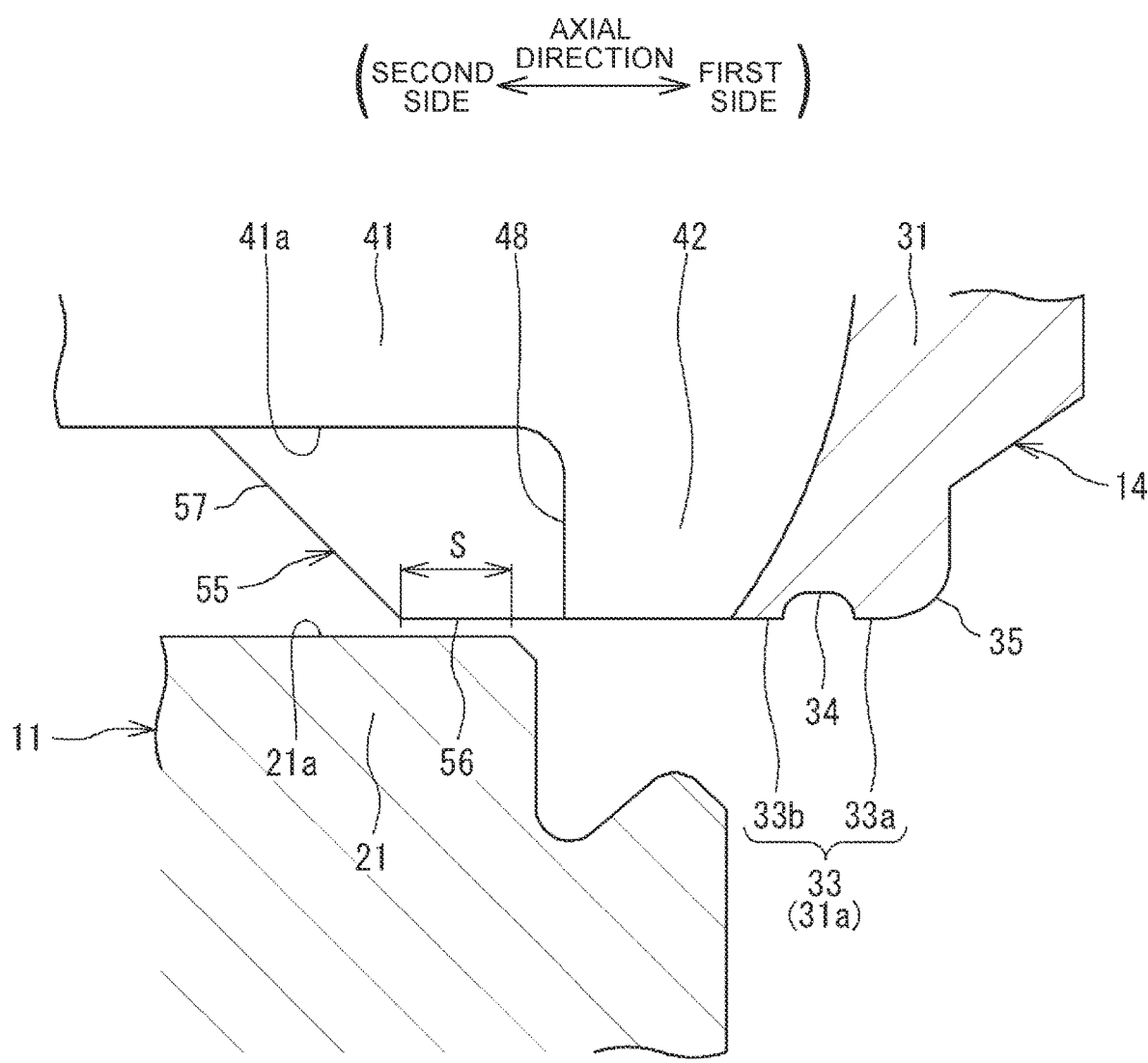
FIG. 9 is an enlarged sectional view of a guide portion and surrounding components in an unassembled state in the cage according to the modification.
Figure 10:
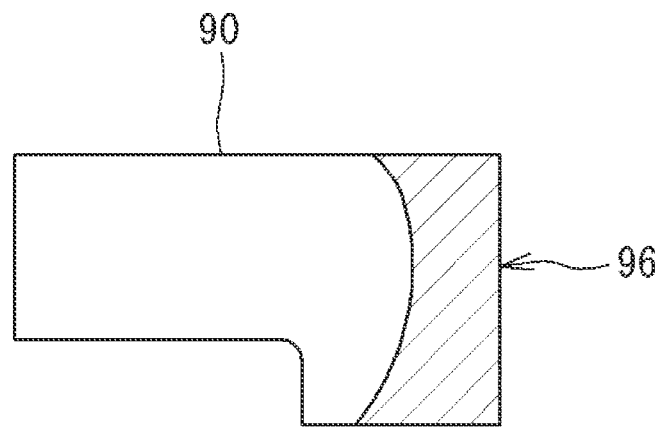
FIG. 10 is a sectional view of a cage of a crown type.
Figure 11:
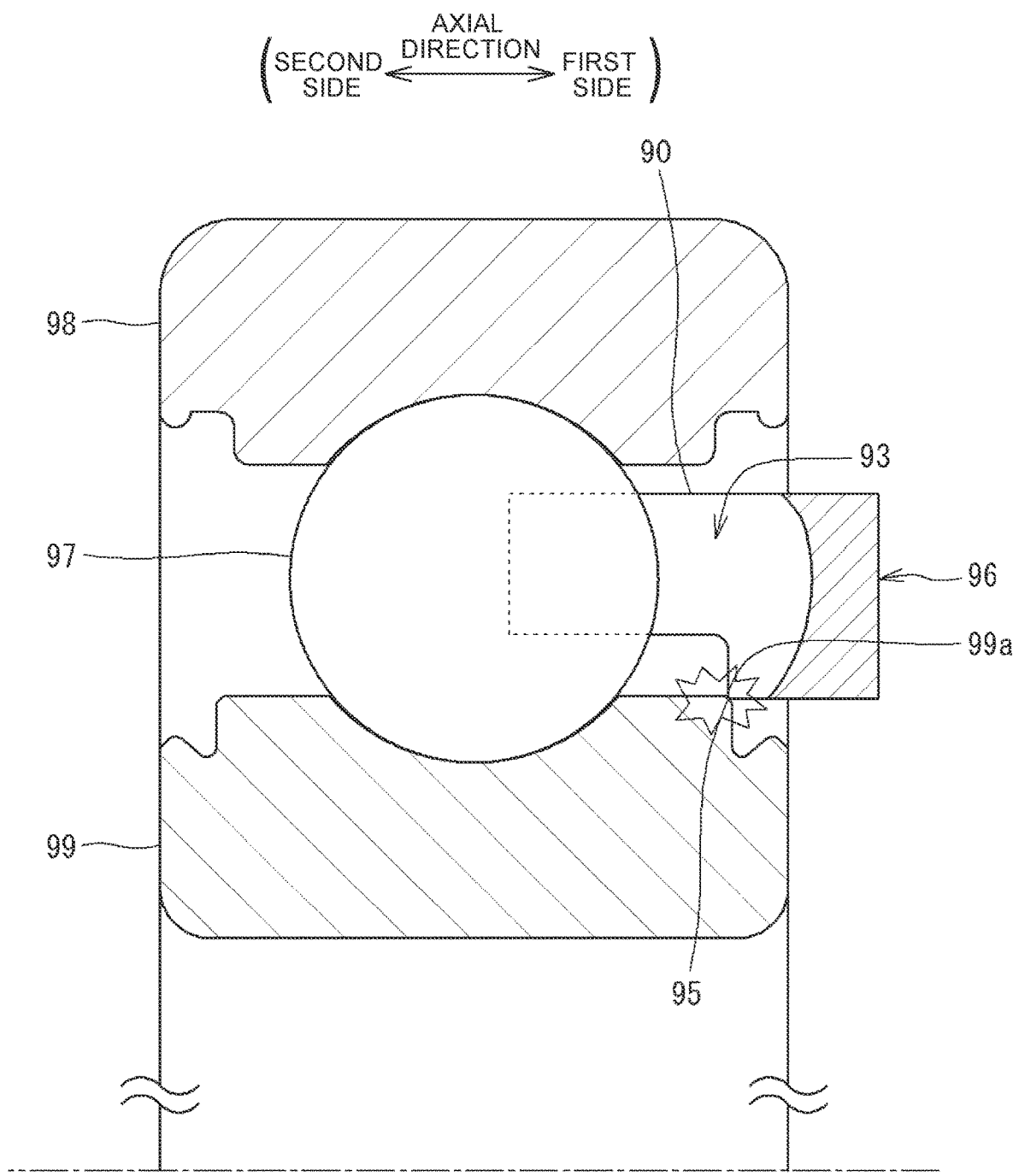
FIG. 11 is a sectional view illustrating assembly of the cage according to the related art.

FIG. 9 is an enlarged sectional view of the guide portion 55 and surrounding components in an unassembled state. As illustrated in FIGS. 7, 8, and 9, the guide portions 55 are provided on the radially inner side of the first projecting portion 41 and on the second axial side of the second projecting portion 42. The guide portions 55 are provided to project radially inward from the radially inside surface 41a of the first projecting portion 41, and toward the second axial side from the end surface 48 of the second projecting portion 42.

The guide portion 55 has the flat surface 56 and the inclined surface 57. As illustrated in FIG. 9, the flat surface 56 is continuous with the contact surface 33 (inner peripheral surface 31a) of the annular portion 31. In addition, the flat surface 56 faces the first shoulder portion 21 of the inner ring 11 in the radial direction in the unassembled state. The inclined surface 57 extends away from the inner ring 11 toward the second axial side from the flat surface 56.

In the unassembled state, the flat surface 56 faces a portion of the outer peripheral surface 21a of the first shoulder portion 21 formed as a cylindrical surface in the range of 1 millimeter or more in the axial direction. This range is indicated as a dimension S in FIG. 9. That is, the dimension S is 1 millimeter or more.

With the configuration described above, when assembling the cage 14 by moving the cage 14 closer to the balls 13 which are interposed between the inner ring 11 and the outer ring 12 as illustrated in FIG. 8, the guide portions 55 can contact the first shoulder portion 21, which is a part of the outer peripheral portion of the inner ring 11, to align the cage 14 with respect to the inner ring 11. That is, when the cage 14 is moved downward from above closer to the balls 13 which are interposed between the inner ring 11 and the outer ring 12, the cage 14 is aligned with respect to the inner ring 11 by the guide portions 55 to establish an unassembled state (see FIG. 5) in which the cage 14 is placed on the balls 13. In the unassembled state, the flat surfaces 56 of the guide portions 55 face the first shoulder portion 21 in the radial direction.

As illustrated in FIG. 7, the pockets 19 of the cage 14 open on the second axial side with a dimension that is smaller than the diameter of the balls 13. Therefore, when assembling the cage 14, as illustrated in FIG. 8, the balls 13 are received in the pockets 19 through the opening 37 by moving the cage 14 closer to the balls 13 from the first axial side and further pressing the cage 14. In this event, a part (lug portion 50) of the cage bars 32 is elastically deformed such that the balls 13 widen the opening 37.

During the assembly, the assembly may be hindered with the second projecting portion 42 caught on the first shoulder portion 21 of the inner ring 11, and the second projecting portion 42 may be damaged if the cage 14 is pressed forcibly. In the rolling bearing 10 according to the present disclosure, however, the cage 14 is aligned (centered) with the inner ring 11 by the guide portions 55. Hence, it is possible to suppress the second projecting portion 42 being caught on the first shoulder portion 21 of the inner ring 11 to hinder the assembly.

The guide portion 55 has the flat surface 56 which is continuous with the inner peripheral surface 31a of the annular portion 31. In the unassembled state, the flat surface 56 faces the first shoulder portion 21 of the inner ring 11 in the radial direction (see FIG. 8). Therefore, the assembly of the cage 14 is completed by linearly pressing the cage 14 in the unassembled state toward the second axial side.

The guide portion 55 further has the inclined surface 57. The inclined surface 57 is shaped to extend away from the inner ring 11 toward the second axial side from the flat surface 56. Therefore, when the cage 14 is moved closer to the balls 13, which are provided between the inner ring 11 and the outer ring 12, from the first axial side in order to assemble the cage 14, the inclined surfaces 57 contact the first shoulder portion 21 of the inner ring 11 before the unassembled state is established. The inclined surfaces 57 allow the cage 14 to be aligned with the inner ring 11 as the cage 14 is moved closer to the balls 13 in the axial direction.

In the present disclosure, the annular portion 31 of the cage 14 has the contact surface 33 which makes sliding contact with the first shoulder portion 21 of the inner ring 11. Therefore, the rolling bearing 10 is an inner ring-guided bearing in which rotation of the cage 14 is guided by the inner ring 11. In the case of an inner ring-guided bearing, the cage 14 and the inner ring 11 are disposed in proximity to each other in the radial direction. Therefore, the second projecting portion 42 of the cage 14 contacts the inner ring 11 (shoulder portion 21) during assembly of the cage 14, which tends to hinder the assembly. However, the guide portion 55 can suppress the second projecting portion 42 being caught on the shoulder portion 21 of the inner ring 11 to hinder the assembly. That is, even the inner ring-guided cage 14 can be assembled smoothly by the guide portions 55.

Others

While the rolling bearing 10 is a deep-groove ball bearing in the present disclosure, the rolling bearing 10 may be in a different form, and may be an angular ball bearing, for example.

The embodiment disclosed above is exemplary in all respects, and not limiting. The scope of the present disclosure is not limited to the embodiment discussed above, and includes all modifications that fall within the scope of equivalence to the configuration described in the claims.

What is claimed is:

1. A rolling bearing comprising:
an inner ring that includes a shoulder portion provided in a first axial direction and an inner ring raceway;
an outer ring that includes an outer ring raceway;
a plurality of rolling elements provided between the inner ring raceway and the outer ring raceway; and
a cage that holds the rolling elements at intervals in a circumferential direction, wherein:
the cage includes an annular portion provided in the first axial direction with respect to the rolling elements, and a plurality of cage bars provided to extend in a second axial direction from the annular portion;
the annular portion includes a contact surface that makes sliding contact with the shoulder portion; and
the cage bars each include a first projecting portion provided to extend in the second axial direction from a portion including an outer peripheral side of the annular portion, and a second projecting portion provided to extend in the second axial direction from a portion including an inner peripheral side of the annular portion, the second projecting portion being shorter than the first projecting portion, and the second projecting portion covers a part of the inner ring raceway on a side of the shoulder portion, wherein
the cage includes a guide portion provided on a radially inner side of the first projecting portion and in the second axial direction from the second projecting portion to align the cage with respect to the inner ring by contacting a part of an outer peripheral portion of the inner ring during assembly of the cage, and
the guide portion includes an inclined surface that extends away from the inner ring toward the second axial direction from a flat surface of the guide portion.

2. The rolling bearing according to claim 1, wherein the contact surface is provided with a recessed portion.

3. The rolling bearing according to claim 1, wherein
the annular portion further includes an undercut surface provided continuously in the first axial direction from the contact surface to extend away from the shoulder portion toward the first axial direction, and
a gap is formed between the shoulder portion and the contact surface along the first and second axial directions.

4. The rolling bearing according to claim 1, wherein a radially inside surface of the second projecting portion and the contact surface are continuous with each other, and provided along an imaginary cylindrical surface centered on a bearing center line.

5. The rolling bearing according to claim 4, wherein a radially inside surface of the first projecting portion is provided along a second imaginary cylindrical surface centered on the bearing center line, the second imaginary cylindrical surface being larger in diameter than the imaginary cylindrical surface.

6. The rolling bearing according to claim 1, wherein
the flat surface is continuous with an inner peripheral surface of the annular portion,
a pocket is provided between a pair of the cage bars which are adjacent in the circumferential direction, and
the pocket opens in the second axial direction with a dimension that is smaller than a diameter of the rolling element.

7. The rolling bearing according to claim 1, wherein the contact surface makes sliding contact with the shoulder portion of the inner ring in the first axial direction.

* * * * *